United States Patent
Olson et al.

(10) Patent No.: US 10,926,346 B2
(45) Date of Patent: Feb. 23, 2021

(54) RESISTANCE SOLDERING SYSTEM

(71) Applicant: Antaya Technologies Corporation, Warwick, RI (US)

(72) Inventors: Gordon Olson, Norton, MA (US); Michael E. Wheaton, W. Warwick, RI (US); William Falk, Warwick, RI (US)

(73) Assignee: ANTAYA TECHNOLOGIES CORPORATION, Warwick, RI (US)

( * ) Notice: Subject to any disclaimer, the term of this patent is extended or adjusted under 35 U.S.C. 154(b) by 262 days.

(21) Appl. No.: 16/012,919

(22) Filed: Jun. 20, 2018

(65) Prior Publication Data
US 2019/0388990 A1    Dec. 26, 2019

(51) Int. Cl.
*B23K 3/08* (2006.01)
*G05B 19/042* (2006.01)

(52) U.S. Cl.
CPC .............. *B23K 3/08* (2013.01); *G05B 19/042* (2013.01); *G05B 2219/23345* (2013.01); *G05B 2219/25252* (2013.01)

(58) Field of Classification Search
CPC ........ B23K 3/08; B23K 1/0004; B23K 3/033; B23K 11/24; G05B 19/042; G05B 2219/25252; G05B 2219/23345
USPC .................. 219/230, 234, 492, 497
See application file for complete search history.

(56) References Cited

U.S. PATENT DOCUMENTS

| | | |
|---|---|---|
| 2,790,059 A | 4/1957 | Nathan |
| 2,969,449 A | 1/1961 | Tyler |
| 3,379,896 A | 4/1968 | Wolfe |
| 3,621,193 A | 11/1971 | Banta |

(Continued)

FOREIGN PATENT DOCUMENTS

| | | |
|---|---|---|
| CA | 783737 | 4/1968 |
| JP | H1154905 A | 2/1999 |
| NL | 8503353 A | 7/1987 |

OTHER PUBLICATIONS

European Search Report for Appl. No. 191805423 dated Feb. 11, 2020.

*Primary Examiner* — Thien S Tran
(74) *Attorney, Agent, or Firm* — Billion & Armitage (57) ABSTRACT

A power delivery system includes a power-input-channel, an AC/DC converter, one or more controller-circuits, a silicon-controlled-rectifier, a transformer, and a pair of output-leads. The power-input-channel receives alternating-current from a power-source. The AC/DC converter converts the alternating-current to a direct-current at a converter-output. The one or more controller-circuits are connected with the converter-output and control a signal indicative of a desired-power-level delivered for a desired-time. The silicon-controlled-rectifier is connected with the power-input-channel and controls an SCR-output-voltage to an SCR-output-channel proportional to the signal. The transformer reduces the SCR-output-voltage from a primary-side to a secondary-voltage on a secondary-side. The pair of output-leads are connected with poles of the secondary-side. A solder-joint is disposed between the pair of output-leads. The one or more controller-circuits determine the signal applied to the silicon-controlled-rectifier required to melt the solder-joint based on the desired-power-level and the desired-time, thereby melting the solder-joint disposed between the pair of output-leads.

18 Claims, 5 Drawing Sheets

(56) References Cited

U.S. PATENT DOCUMENTS

| | | | | |
|---|---|---|---|---|
| 3,962,562 | A | 6/1976 | Carter et al. | |
| 6,326,580 | B1* | 12/2001 | Hiiro | B23K 11/241 |
| | | | | 219/110 |
| 2001/0027962 | A1* | 10/2001 | Moro | B23K 3/033 |
| | | | | 219/85.22 |
| 2002/0071293 | A1* | 6/2002 | Eden | H01L 29/4238 |
| | | | | 363/20 |
| 2004/0073319 | A1* | 4/2004 | Monari | G05B 13/048 |
| | | | | 700/14 |
| 2012/0043818 | A1* | 2/2012 | Stratakos | H02J 3/381 |
| | | | | 307/77 |

\* cited by examiner

RESISTANCE SOLDERING SYSTEM

TECHNICAL FIELD OF INVENTION

This disclosure generally relates to a soldering system, and more particularly relates to a resistance soldering system.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
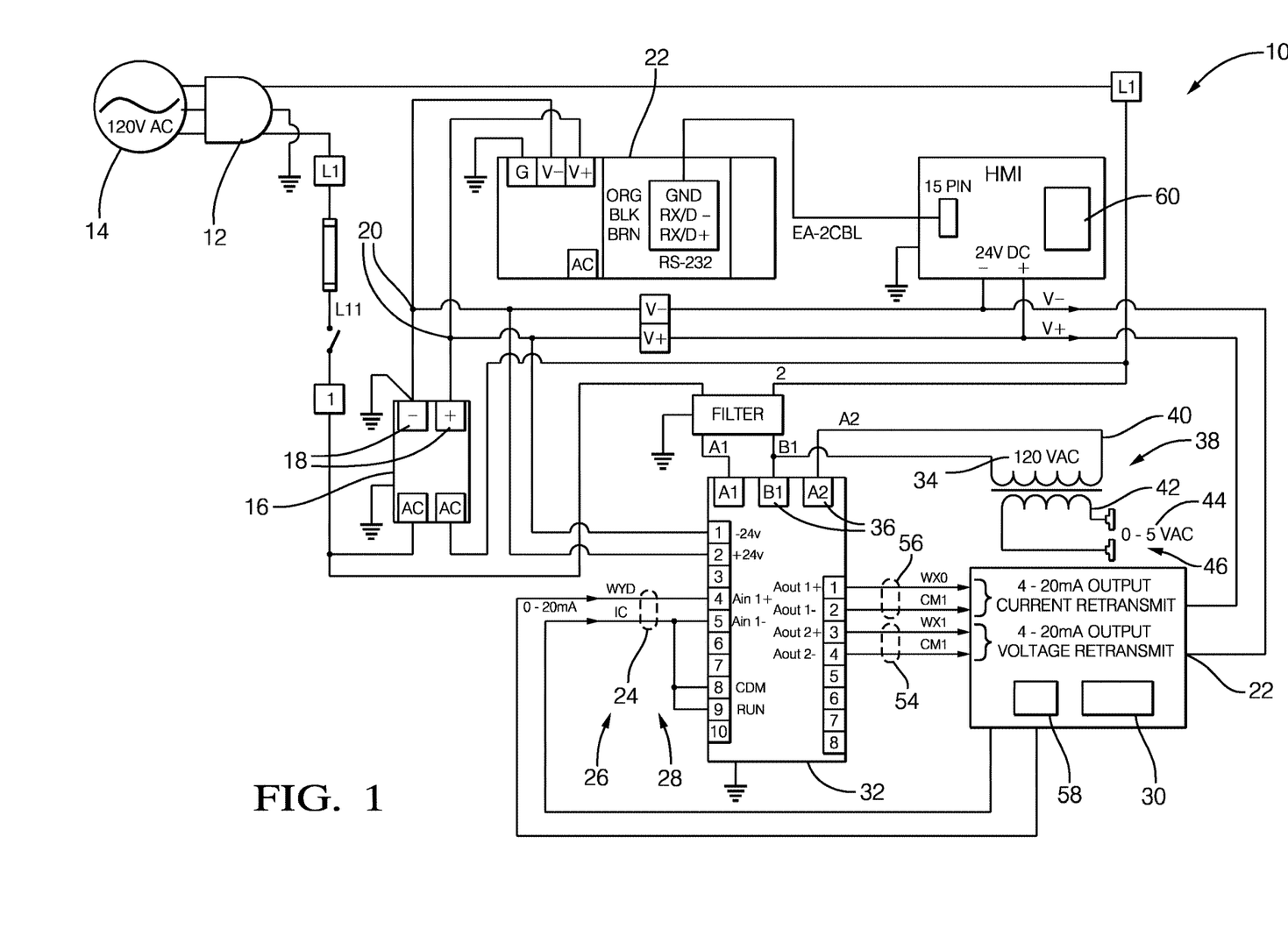
FIG. 1 is a schematic diagram of a resistance soldering system in accordance with one embodiment.

FIG. 1 illustrates a resistance soldering system 10, hereafter referred to as the system 10. As will be described in more detail herein, the system 10 is beneficial because the system 10 controls a power delivered to a solder-joint (not shown) for a specified time to melt the solder-joint. The system 10 includes a power-input-channel 12 receiving an alternating-current 14 from a power-source (e.g. a power receptacle connected to a power-grid—not shown). The power-source may be any power-source, and in the example illustrated in FIG. 1 is a 120-volt AC (120 VAC) power-source.

The system 10 also includes an AC-to-DC converter 16 (AC/DC-converter 16) in electrical communication with the power-input-channel 12. The AC/DC-converter 16 converts a portion of the alternating-current 14 to a direct-current 18 at a converter-output 20. The AC/DC-converter 16 may be any type of AC/DC-converter, and in the example illustrated in FIG. 1 generates an output voltage of about 24 VDC.

The system 10 also includes one or more controller-circuits 22 in electrical communication with the converter-output 20. The one or more controller-circuits 22 control a signal 24 indicative of a desired-power-level 26 delivered for a desired-time 28. In the example illustrated in FIG. 1, the signal 24 is a current-signal in a range of 0 mA to 20 mA. In another embodiment (not shown), the signal 24 a voltage-signal. The one or more controller-circuits 22 may include a processor (not shown) such as a microprocessor or other control circuitry such as analog and/or digital control circuitry including an application specific integrated circuit (ASIC) for processing data as should be evident to those in the art. The one or more controller-circuits 22 include a memory 30, including non-volatile memory, such as electrically erasable programmable read-only memory (EEPROM) for storing one or more routines, thresholds, and captured data. The one or more routines may be executed by the processors to perform steps for controlling the signal 24 as described above. The one or more controller-circuits 22 may be distributed throughout the system 10 and communicate with one another through a wiring harness (not specifically shown), or may be housed in a common enclosure. As will be appreciated, the one or more controller-circuits 22 may be separate circuitry, be the same circuitry, subsystems of one another, or any combination thereof. As also will be appreciated, the functions performed by the one or more controller-circuits 22 may be handled by each individual controller-circuit 22 or distributed between them, e.g., load balancing.

The system 10 also includes a silicon-controlled-rectifier 32 (SCR 32) in electrical communication with the power-input-channel 12, the converter-output 20, and the signal 24. The SCR 32 controls an SCR-output-voltage 34 to a SCR-output-channel 36, wherein the SCR-output-voltage 34 is proportional to the signal 24. The SCR 32 may be any phase angle operated SCR 32 suitable for the application. One such SCR 32 is the UF1HXTE0-08-PIR0Z manufactured by Control Concepts, Inc. of Chanhassen, Minn., USA. In the example illustrated in FIG. 1, the SCR-output-voltage 34 is 0 VAC to 120 VAC.

The system 10 also includes a transformer 38 having a primary-side 40 and a secondary-side 42. The primary-side 40 is in electrical communication with the SCR-output-channel 36 and receives the 0 VAC to 120 VAC potential from the SCR 32 as described above. The transformer 38 reduces (i.e. steps down) the SCR-output-voltage 34 from the primary-side 40 (e.g. 120 VAC) to a secondary-voltage 44 on the secondary-side 42. The transformer 38 may be any transformer 38 that reduces the SCR-output-voltage 34, and in the example illustrated in FIG. 1, reduces the SCR-output-voltage 34 to a range of 0 VAC to about 5 VAC.

The system 10 also includes a pair of output-leads 46 in electrical communication with poles of the secondary-side 42 of the transformer 38. The pair of output-leads 46 are configured to apply the secondary-voltage 44 to the solder-joint disposed between the pair of output-leads 46. The pair of output-leads 46 may terminate at corresponding electrodes (not shown) that contact the solder-joint and are preferably formed of a carbon-based material, such as graphite.

Figure 2A:
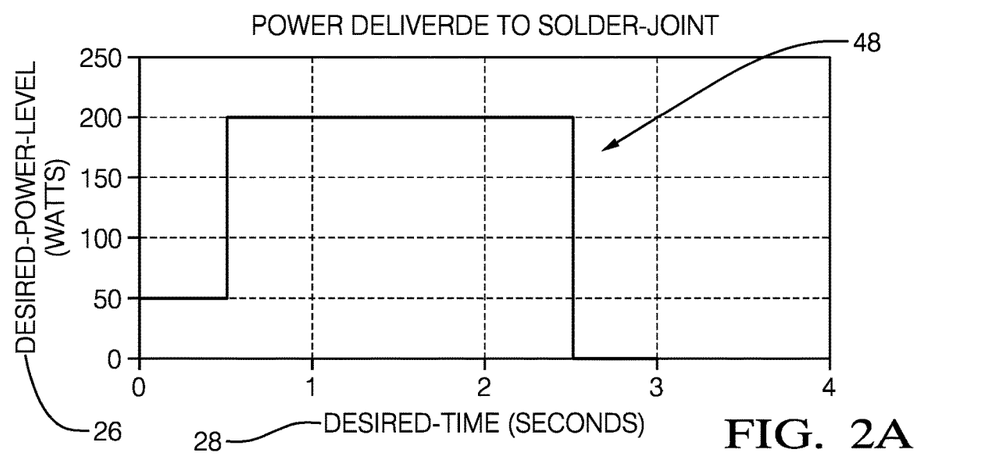
FIG. 2A is a graph illustrating a power delivered over time by the resistance soldering system of FIG. 1 in accordance with one embodiment.
Figure 2B:
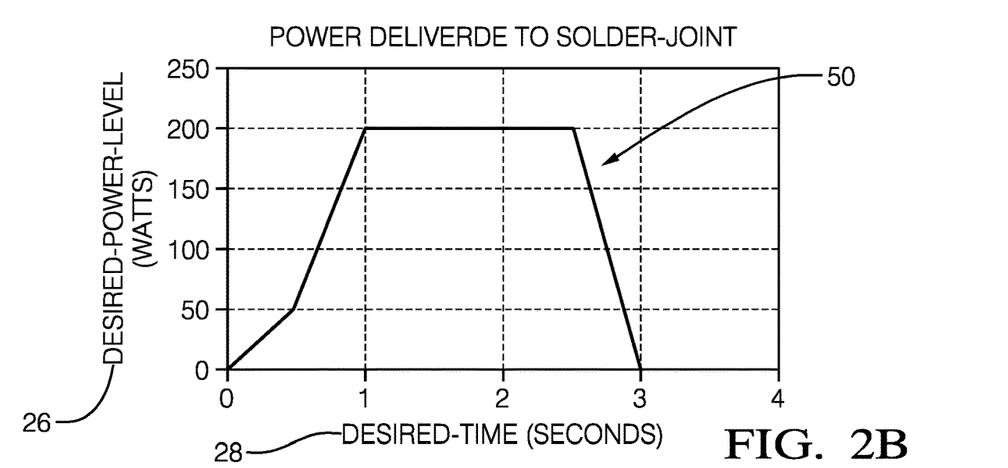
FIG. 2B is another plot illustrating the power delivered over time by the resistance soldering system of FIG. 1 in accordance with one embodiment.
Figure 2C:
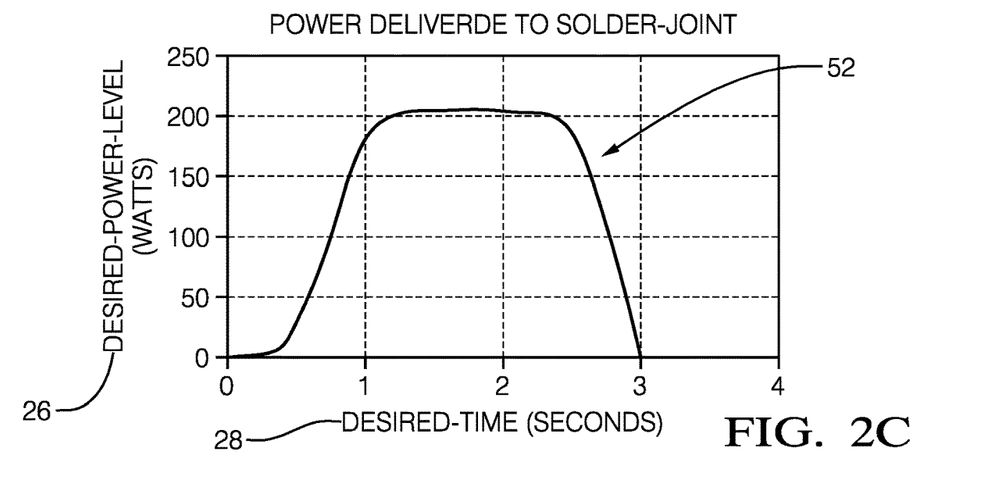
FIG. 2C is yet another plot illustrating the power delivered over time by the resistance soldering system of FIG. 1 in accordance with one embodiment.

FIGS. 2A-2C are plots illustrating examples of the desired-power-level 26 applied to the solder-joint for the desired-time 28. The one or more controller-circuits 22 determine the signal 24 applied to the SCR 32 required to melt the solder-joint based on the desired-power-level 26 and the desired-time 28, thereby melting the solder-joint disposed between the pair of output-leads 46. It will be appreciated that the total energy applied to the solder-joint is indicated by an area beneath the curves of each plot, and in the examples illustrated in FIGS. 2A-2C has units of Watt-seconds (W-s). The one or more controller-circuits 22 may be programmed with specific ramp-rates and/or dwell-times based on characteristics of the solder-joint including geometric dimensions, solder-alloy composition, and materials being joined by the solder. The one or more controller-circuits 22 controls the desired-power-level 26 independent of the desired-time 28. This is in contrast to prior art resistance soldering systems that typically require a total energy input be commanded, wherein the time to deliver the energy varies based on a quality of the electrical connection between the contacts and the solder-joint. The system 10 is an improvement over prior art resistance soldering systems because the system 10 adds another degree of freedom to the resistance soldering process, i.e., the desired-time 28. Accordingly, the one or more controller-circuits 22 controls the desired-time 28 independent of the desired-power-level 26. As illustrated in FIGS. 2A-2B, the desired-power-level 26 is characterized by a linear-function 48 and/or a piece-wise-linear-function 50. As illustrated in FIG. 2C, the desired-power-level 26 is characterized by a polynomial-function 52. Soldering profiles containing the desired-power-level 26 and the desired-time 28 are user defined and based on the characteristics of the solder-joint as described above.

Referring back to FIG. 1, the SCR 32 further includes a voltage-output-signal 54 and a current-output-signal 56 in electrical communication with the one or more controller-circuits 22. The voltage-output-signal 54 and the current-output-signal 56 are indicative of a total-power-delivered 58 to the primary-side 40 of the transformer 38. That is, the voltage-output-signal 54 and the current-output-signal 56 are scaled by the one or more controller-circuits 22 to determine the total-power-delivered 58 to the primary-side 40 of the transformer 38, and both are characterized by electrical currents in the range of 4 mA to 20 mA. The one or more controller-circuits 22 determine the total-power-delivered 58 to the pair of output-leads 46 based on the voltage-output-signal 54 and the current-output-signal 56, and may also take into account any electrical efficiency losses through the transformer 38 and/or wiring. The system 10 stores the voltage-output-signal 54 and the current-output-signal 56 in the memory 30 of the one or more controller-circuits 22 for historical purposes and may be accessed by an operator.

The system 10 also includes a visual-display 60 that is a component of a human-machine-interface (HMI—not specifically shown). The voltage-output-signal 54 and the current-output-signal 56 are displayed on the visual-display 60 for viewing by the operator and may be used for quality control purposes.

Figure 3:
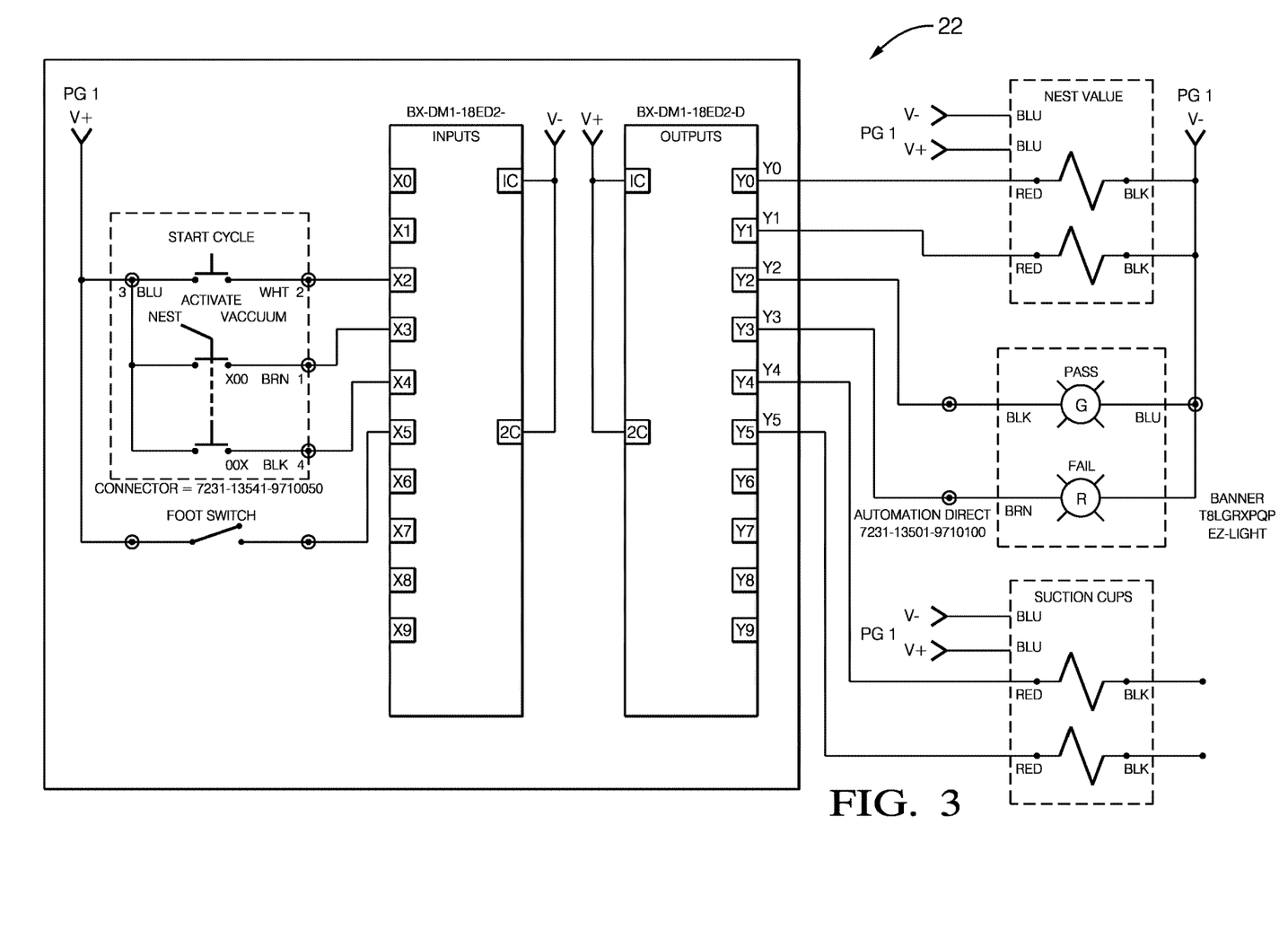
FIG. 3 is a schematic diagram of a controller-circuit of the resistance soldering system of FIG. 1 in accordance with one embodiment.
Figure 4:
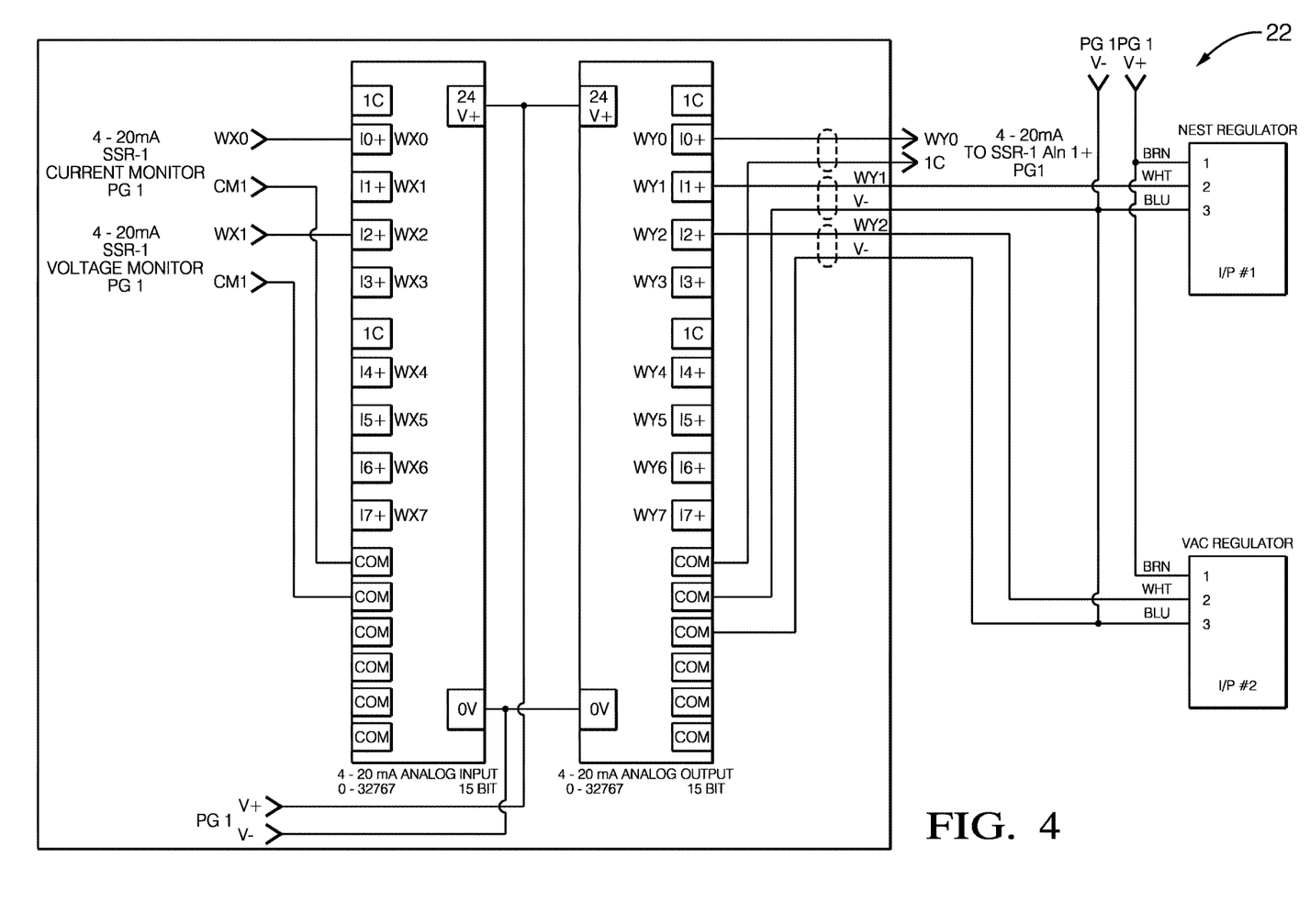
FIG. 4 is a schematic diagram of another controller-circuit of the resistance soldering system of FIG. 1 in accordance with a different embodiment.

FIGS. 3-4 illustrate additional details of the one or more controller-circuits that are used in the system 10.

Figure 5:
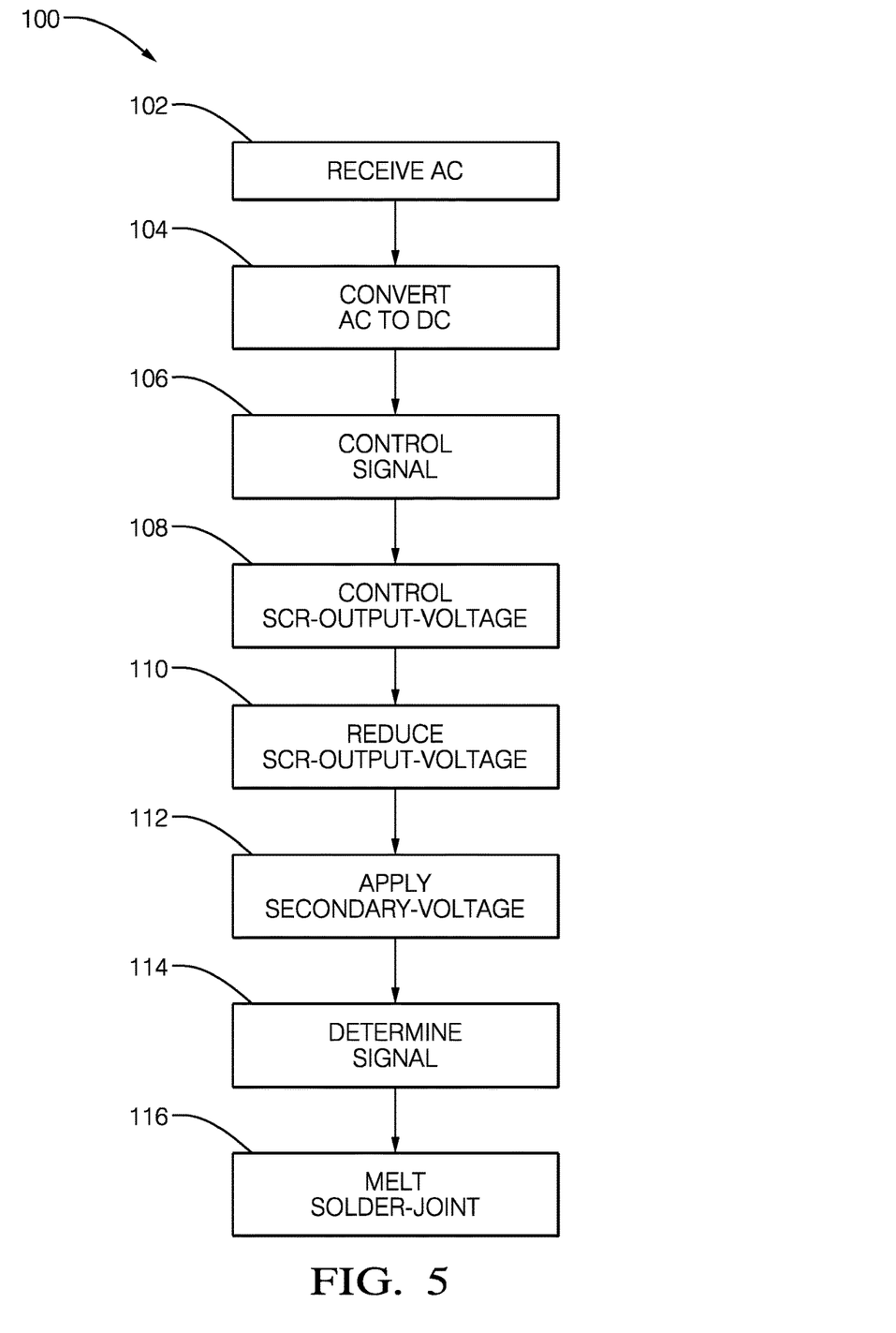
FIG. 5 is a flow chart illustrating a method of operating the resistance soldering system of FIG. 1 in accordance with another embodiment.

FIG. 5 is a flow chart illustrating another embodiment of a method 100 of operating a resistance soldering system 10, hereafter referred to as the system 10.

Step 102, RECEIVE AC, includes receiving an alternating-current 14 from a power-source with a power-input-channel 12 as described above and illustrated in FIG. 1.

Step 104, CONVERT AC TO DC, includes converting a portion of the alternating-current 14 to a direct-current 18 at a converter-output 20 with an AC-to-DC converter 16 (AC/DC-converter 16) in electrical communication with the power-input-channel 12 as described above and illustrated in FIG. 1.

Step 106, CONTROL SIGNAL, includes controlling a signal 24 indicative of a desired-power-level 26 delivered for a desired-time 28 with one or more controller-circuits 22 in electrical communication with the converter-output 20. In the example illustrated in FIG. 1, the signal 24 is a current-signal in a range of 0 mA to 20 mA, and in another embodiment (not shown), the signal 24 is a voltage-signal. The one or more controller-circuits 22 controls the desired-power-level 26 independent of the desired-time 28, and controls the desired-time 28 independent of the desired-power-level 26.

Step 108, CONTROL SCR-OUTPUT-VOLTAGE, includes controlling an SCR-output-voltage 34 to a SCR-output-channel 36 proportional to the signal 24 with a silicon-controlled-rectifier 32 (SCR 32) as described above. In the example illustrated in FIG. 1, the SCR-output-voltage 34 is 0 VAC to 120 VAC. The SCR 32 further includes a voltage-output-signal 54 and a current-output-signal 56 that are indicative of a total-power-delivered 58 to a primary-side 40 of a transformer 38, as described above and illustrated in FIG. 1.

Step 110, REDUCE SCR-OUTPUT-VOLTAGE, includes reducing, with the transformer 38 the SCR-output-voltage 34 from the primary-side 40 to a secondary-voltage 44 on a secondary-side 42 of the transformer 38 as described above. The transformer 38 may be any transformer 38 that reduces the SCR-output-voltage 34, and preferably reduces the SCR-output-voltage 34 to a range of 0 VAC to about 5 VAC as described above.

Step 112, APPLY SECONDARY-VOLTAGE, includes applying, with a pair of output-leads 46 in electrical communication with poles of the secondary-side 42 of the transformer 38, the secondary-voltage 44 to a solder-joint disposed between the pair of output-leads 46. The pair of output-leads 46 may terminate at corresponding electrodes that contact the solder-joint and are preferably formed of a carbon-based material, such as graphite.

Step 114, DETERMINE SIGNAL, includes determining, with the one or more controller-circuits 22, the signal 24 applied to the SCR 32 required to melt the solder-joint based on the desired-power-level 26 and the desired-time 28. FIGS. 2A-2B, illustrate the desired-power-level 26 characterized by a linear-function 48 and/or a piece-wise-linear-function 50. As illustrated in FIG. 2C, the desired-power-level 26 is characterized by a polynomial-function 52. The voltage-output-signal 54 and the current-output-signal 56 that are indicative of the total-power-delivered 58 to the primary-side 40 of the transformer 38 are stored in a memory 30 of the one or more controller-circuits 22 as described above. The voltage-output-signal 54 and the current-output-signal 56 are displayed on a visual-display 60 for viewing by an operator and may be used for quality control purposes, as described above.

Step 116, MELT SOLDER-JOINT, includes melting the solder-joint disposed between the pair of output-leads 46 with the secondary-voltage 44 as described above.

Accordingly, a resistance soldering system 10 (the system 10) and a method 100 of operating the system 10 are provided. The system 10 is an improvement over prior art resistance soldering systems because the system 10 controls the desired-power-level 26 independent of the desired-time 28.

While this invention has been described in terms of the preferred embodiments thereof, it is not intended to be so limited, but rather only to the extent set forth in the claims that follow. "One or more" includes a function being performed by one element, a function being performed by more than one element, e.g., in a distributed fashion, several functions being performed by one element, several functions being performed by several elements, or any combination of the above. It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact. The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

We claim:

1. A resistance soldering system, comprising:
   a power input channel receiving an alternating current from a power source;
   an AC-to-DC converter in electrical communication with the power input channel and converting a portion of the alternating current to a direct current at a converter output;
   one or more controller circuits in electrical communication with the converter output, the one or more controller circuits controlling a signal indicative of a desired power level delivered for a desired time;
   a silicon-controlled rectifier in electrical communication with the power input channel, the converter output, and the signal and controlling an SCR output voltage to an SCR output channel proportional to the signal;
   a transformer having a primary side and a secondary side, the primary side in electrical communication with the SCR output channel, the transformer reducing the SCR output voltage from the primary side to a secondary voltage on the secondary side; and
   a pair of output leads in electrical communication with poles of the secondary side of the transformer and configured to apply the secondary voltage to a solder joint disposed between the pair of output leads,
   wherein the one or more controller circuits determine the signal applied to the silicon controlled rectifier required to melt the solder joint based on the desired power level and the desired time, thereby melting the solder joint disposed between the pair of output leads and wherein the one or more controller circuits controls the desired power level independent of the desired time.

2. The system in accordance with claim 1, wherein the signal is a current signal.

3. The system in accordance with claim 1, wherein the signal is a voltage signal.

4. The system in accordance with claim 1, wherein the silicon controlled rectifier further includes a voltage output signal and a current output signal in electrical communication with the one or more controller circuits, the voltage output signal and the current output signal indicative of a total power delivered to the primary side of the transformer, whereby the one or more controller circuits determine the total power delivered to the pair of output leads based on the voltage output signal and the current output signal.

5. The system in accordance with claim 4, wherein the voltage output signal and the current output signal are stored in a memory of the one or more controller circuits.

6. The system in accordance with claim 4, wherein the system further includes a visual display, and the voltage output signal and the current output signal are displayed on the visual display.

7. The system in accordance with claim 1, wherein the desired power level is characterized by a linear function.

8. The system in accordance with claim 7, wherein the linear function is further characterized by a piece wise linear function.

9. The system in accordance with claim 1, wherein the desired power level is characterized by a polynomial function.

10. A method of operating a resistance soldering system, comprising:
    receiving an alternating current from a power source with a power input channel;
    converting a portion of the alternating current to a direct current at a converter output with an AC-to-DC converter in electrical communication with the power input channel;
    controlling a signal indicative of a desired power level delivered for a desired time with one or more controller circuits in electrical communication with the converter output;
    controlling an SCR output voltage to a SCR output channel proportional to the signal with a silicon-controlled rectifier in electrical communication with the power input channel, the converter output, and the signal;
    reducing, with a transformer having a primary side and a secondary side, the primary side in electrical communication with the SCR output channel, the SCR output voltage from the primary side to a secondary voltage on the secondary side;
    applying, with a pair of output leads in electrical communication with poles of the secondary side of the transformer, the secondary voltage to a solder joint disposed between the pair of output leads; and
    determining, with the one or more controller circuits, the signal applied to the silicon controlled rectifier required to melt the solder joint based on the desired power level and the desired time, thereby melting the solder joint disposed between the pair of output leads, wherein the one or more controller circuits controls the desired time independent of the desired power level.

11. The method in accordance with claim 10, wherein the signal is a current signal.

12. The method in accordance with claim 10, wherein the signal is a voltage signal.

13. The method in accordance with claim 10, wherein the silicon controlled rectifier further includes a voltage output signal and a current output signal in electrical communication with the one or more controller circuits, the voltage output signal and the current output signal indicative of a total power delivered to the primary side of the transformer, wherein the method further includes determining, with the one or more controller circuits, the total power delivered to the pair of output leads based on the voltage output signal and the current output signal.

14. The method in accordance with claim 13, further including storing the voltage output signal and the current output signal in a memory of the one or more controller circuits.

15. The method in accordance with claim 13, wherein the system further includes a visual display and wherein the method further includes displaying the voltage output signal and the current output signal on the visual display.

16. The method in accordance with claim 10, wherein the desired power level is characterized by a linear function.

17. The method in accordance with claim 16, wherein the linear function is further characterized by a piece wise linear function.

18. The method in accordance with claim 10, wherein the desired power level is characterized by a polynomial function.

* * * * *